Figure 1:
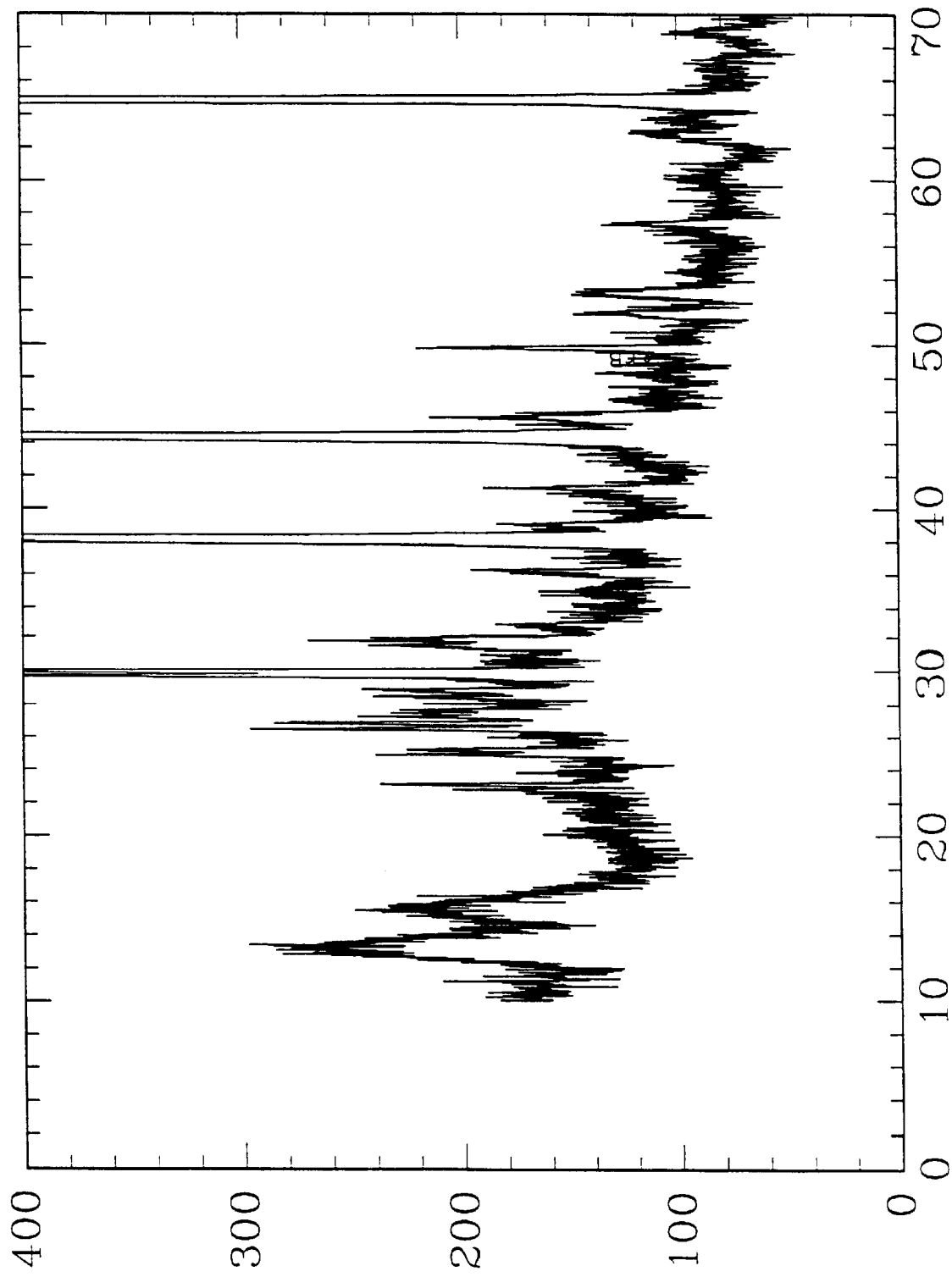

United States Patent [19]
Helsen et al.

[11] Patent Number: 6,009,724
[45] Date of Patent: Jan. 4, 2000

[54] PROCESS FOR PREPARING GLASS AND FOR CONDITIONING THE RAW MATERIALS INTENDED FOR THIS GLASS PREPARATION

[76] Inventors: Jozef A. Helsen, Zavelstraat 2B, B-3010 Leuven; Joris Proost, Kruisberg 22; Etienne Brauns, Lemmensblok 2, both of B-2400 Mol, all of Belgium

[21] Appl. No.: 08/913,570

[22] PCT Filed: Mar. 15, 1996

[86] PCT No.: PCT/BE96/00029

§ 371 Date: Sep. 17, 1997

§ 102(e) Date: Sep. 17, 1997

[87] PCT Pub. No.: WO96/29292

PCT Pub. Date: Sep. 26, 1996

[30] Foreign Application Priority Data

Mar. 17, 1995 [BE] Belgium ................................ 09500242

[51] Int. Cl.[7] ............................. C03B 9/00; C03B 19/10; C03B 23/00; C03B 37/00
[52] U.S. Cl. ............................. 65/17.3; 65/391; 65/21.1; 65/136.1; 65/144
[58] Field of Search ............................. 65/391, 414, 421, 65/436, 17.3, 21.1, 21.3, 60.5, 60.8, 134.1, 135.9, 136.1, 142, 144; 501/27, 53, 55, 56, 58, 61, 63

[56] References Cited

U.S. PATENT DOCUMENTS

| | | |
|---|---|---|
| 3,290,723 | 12/1966 | Jaques et al. . |
| 3,533,756 | 10/1970 | Houseman .............................. 65/21.1 |
| 4,358,541 | 11/1982 | Andrus et al. . |
| 4,689,212 | 8/1987 | Mansfield . |
| 4,715,878 | 12/1987 | Kopatz et al. . |
| 4,756,746 | 7/1988 | Kemp, Jr. et al. . |
| 4,783,214 | 11/1988 | Kemp, Jr. et al. . |
| 5,157,685 | 10/1992 | Jensen . |
| 5,637,127 | 6/1997 | McLaughlin et al. . |

FOREIGN PATENT DOCUMENTS

| | | |
|---|---|---|
| 0 107 428 | 5/1984 | European Pat. Off. . |
| 0390397 | 10/1990 | European Pat. Off. . |
| 0535388 | 4/1993 | European Pat. Off. . |
| 0622342 | 11/1994 | European Pat. Off. . |
| 1211766 | 3/1966 | Germany . |
| 1906209 | 9/1969 | Germany . |
| 4100604 | 2/1992 | Germany . |

OTHER PUBLICATIONS

J. Grabmaier, et al., "Growth of Quartz Glass Rods for Fiber Optics in a Plasma Torch Using Powdered $SiO_2$ Starting Material", Research and Development Reports, vol. 4, No. 5, pp. 310–317, 1975.

*Primary Examiner*—Stanley S. Silverman
*Assistant Examiner*—Jacqueline A. Ruller
*Attorney, Agent, or Firm*—Browdy and Neimark

[57] ABSTRACT

The invention concerns a process for preparing glass, more specifically glass powder or glass films, together with a process for conditioning the raw materials intended for preparing glass characterized in that raw materials are converted to freely flowing powder suitable for feeding to a plasma torch in which the powder is converted to glass.

16 Claims, 2 Drawing Sheets

PROCESS FOR PREPARING GLASS AND FOR CONDITIONING THE RAW MATERIALS INTENDED FOR THIS GLASS PREPARATION

The invention concerns a process for preparing glass, more specifically glass powder or glass films.

The term "glass" is used for an inorganic material that is amorphous except for the crystalline phased forms in the amorphic matrix during cooling or during a thermal post-treatment, such as ceramic glass. The glass concerned is glass whose basic components are the oxides of silicon, sodium and calcium.

The term "biologically active glasses" or "bioactive glasses" (abbreviated to BAG) is used in this text to refer to a generic class of materials which also belong to the "glasses" but which furthermore:

are characterised by a surface that actively provokes a positive reaction of the biological tissue in which they are implanted;

contain phosphorus in addition to the oxides of silicon, sodium and calcium as the base, together with additives to control the solubility, such as calcium fluoride. Sodium and calcium can at least partly be substituted by other alkali or alkaline earth metals.

As regards the technique for applying coatings of bioglass, reference is made to the work by A. Ravaglioli and A. Krajewski: BIOCERAMICS, published by Chapman & Hall, 1992 (ISBN 0 412 34960 4) pp 228–229, which describes a technique by means of which the glass is applied as a coating on a substrate by slip casting, in the form of a dispersion in a liquid with a binder, i.e. after manufacture of the glass in the usual manner, by melting at temperatures in the region of 1,450° C. After this, the substrate with the coating must be heated to high temperatures, specifically above 1,100° C., a technique which is not always favourable for the properties of the substrate. The work further describes how coatings can also be applied by plasma spraying with glass powder obtained from glass prepared in the conventional way, or by dipping (rapid immersion) in molten glass.

The patent literature also contains detailed descriptions of techniques for manufacturing powders with particular moulding characteristics, if required with a narrow distribution of the grain size. In summary it can be said that these texts all describe techniques based on material that is reduced in its dimensions by physical pre-treatment, such as grinding, from which a suitable fraction is separated out. In a last operation, the particles are then if required converted to a suitable geometry, e.g. spherical particles. Examples are: U.S. Pat. No. 4,783,214; 4,715,878 and 4,756,746 and DE 41 00 604.

The use of plasmas is also extensively described in the literature. An example is the growth of glass rods for fibre optic purposes in a plasma torch. The substances introduced into the plasma torch in this case have the same structure as those obtained after treatment in a plasma torch (Siemens Forschung- und Entwicklungsbericht Bd. (1975) No. 5 pp 310–317). In DE-A-1906209 a technique is also described for the continuous preparation of ceramic products by melting in an arc or flame of ceramic particles.

BAGs have a long history of biomaterials since their introduction by Hench in 1969. The mechanical and biological properties of BAGs and BAG ceramics have been extensively described around the world in many contributions to scientific journals. The different techniques for the synthesis and application of coatings on metal substrates are also well documented. In this connection, reference is made to the book "An introduction to bioceramics" edited by L. L. Hench and J. Wilson (Adv. Ser. in Ceramics, Vol. 1, World Scientific, 1993. ISBN 981-02-1400-6 or 981-02-1626-2 (pbk)), in which the authors of the different chapters refer to the most relevant literature references. Concerning the technique for applying bioglass coatings, reference can be made to the above-mentioned work by A. Ravaglioli and A. Krajewski.

The disadvantages of the process by which the glass powder has so far been prepared can be summarised as follows: melting the glass must be carried out in expensive crucibles (e.g. platinum), at least if the glass is not be contaminated by unwanted substances. During the melting of relatively small amounts, the composition cannot be kept under control. Since this process has normally to be carried out at high temperatures, it is not energy-friendly. After this, the glass has to be crushed and ground to powder. Since the glass largely breaks into splinter-shaped particles, the fraction of freely flowing, sprayable powder is small. And whenever the composition has to be altered, it is necessary to repeat the whole process.

Despite the long history and intrinsically very interesting biocompatible properties of BAG, the practical applications have remained very limited. The same applies in general to non-biologically-active glasses. The difficulty of obtaining a coating in an economically interesting manner is one of the possible reasons why the BAGs have not yet made their breakthrough.

The present invention has as its object to propose a process for preparing glass with widely varying properties, such as bioactive glass (BAG).

It concerns in particular an economically reasonable process according to which glass can be synthesised either in powder form or in the form of a coating on substrates.

To this end, the raw materials from which the glass is to be made are converted to glass in a plasma torch, where by "raw materials" is meant materials which undergo a chemical reaction between each other to form glass; this means that glass as such is excluded as a raw material in the context of this invention.

The techniques described in the above-mentioned literature do not interfere with the present invention in which the raw materials are converted to particles which form an intimate mixture in the appropriate ratio of the components. The latter are reactively converted in the plasma torch to the desired end product, either powders or coatings.

Said raw materials can advantageously be substantially homogeneously in terms of composition mixed with each other in powder or granule form, and then supplied to a plasma torch such that they are converted to glass by reactions between each other.

The invention further concerns a process for preparing the raw materials concerned in the form of a free flowing powder that is particularly suitable for supplying to a plasma torch in which it is then converted into glass.

Other features and advantages of the invention will be apparent from the following description of several embodiments of the invention which are given by way of example only and do not limit its scope; the descriptions refer to the accompanying figures.

Figure 2:
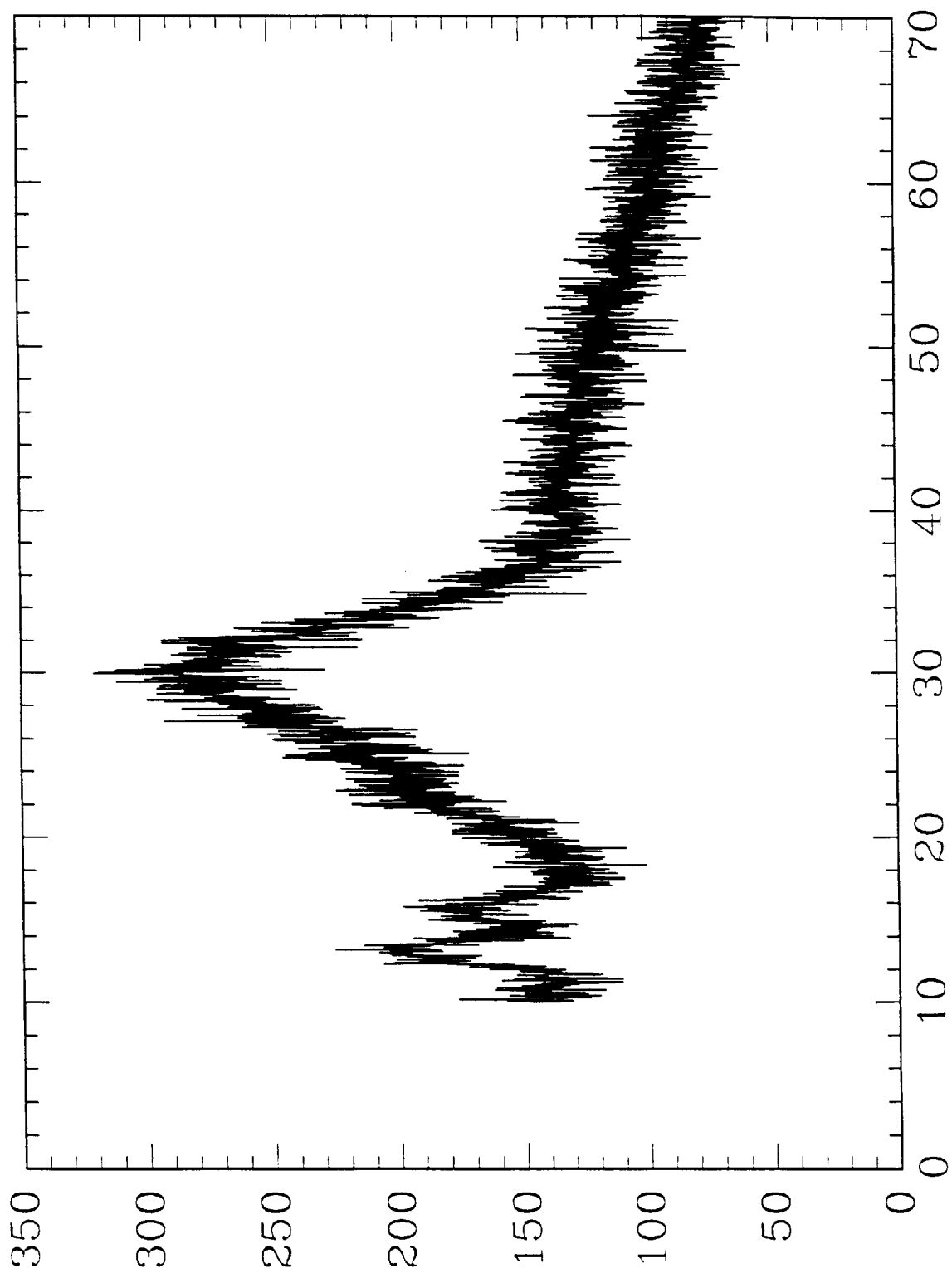

FIG. 1 represents a powder diffraction diagram for a bioglass obtained by melting, while FIG. 2 represents a similar powder diffraction diagram of a bioglass obtained by synthesis in a plasma torch.

These diffraction diagrams are recorded on a powder diffractometer using an X-ray tube with copper anode ($\lambda(K\alpha)=1.542$ Å) and a nickel filter, with the X-axis showing the intensity in counts per second and the Y-axis showing the diffraction angle in 2θ°.

In general it can be said that the heart of the invention is the synthesis of glasses in a plasma torch, starting from mainly crystalline raw materials. For this purpose, a freely flowing powder suitable for feeding the plasma torch must be prepared from the raw materials. This powder is then converted into glass during its stay in the torch. If the spraying is carried out in a closed vessel, then the glass can be collected as a powder, while if the spraying is carried out on a substrate, then a coating can be formed on the latter. Metals, polymers or ceramics can for example be used as the substrate.

In an advantageous embodiment of the process according to the invention, use is made of raw materials in the form of powder with a particle size distribution smaller than 50 μm and preferably smaller than 30 μm.

All materials used for the preparation of glass, with the exception of glass itself, can be considered as raw materials, such as silicates, carbonates, phosphates, fluorides, borates and suchlike of alkali and alkaline earth metals, in particular calcium and sodium, as well as silicon dioxide. The specific choice of raw materials depends on the desired properties of the glass to be produced.

Said raw materials are more specifically as follows:

calcium or sodium silicate $(CaO)_a(SiO_2)_b$ or $(Na_2O)_a(SiO_2)_b$ and have a non-stoichiometric composition. The commercially-available products generally have an excess of $SiO_2$; the exact composition of each batch must be determined by chemical analysis;

silicon dioxide ($SiO_2$). The dioxide is available in powder with extremely small particle size, and can be used as a source of silicon whenever this is necessary to obtain the required composition of the glass;

calcium and/or sodium carbonate ($CaCO_3$ or $Na_2CO_3$) as a flux;

phosphate added in various forms. Examples are: (tri) calcium phosphate ($Ca_3(PO_4)_2$) calcium apatites ($Ca_{10}(PO_4)_6(X)_2$ with X=OH, F, Cl or other phosphates of hydrogen and/or alkali and/or alkaline earth ions;

meta- or tetraborate of sodium or lithium (Li-, $NaBO_3$, $Li_2$, $Na_2B_4O_7$ or their hydrates).

Whenever the phosphates are absent, an ordinary glass is obtained, while with phosphate a BAG can be obtained.

Calcium and sodium can be replaced, at least partly, by other alkaline earth ions, such as magnesium, or alkali ions such as potassium. The choice of raw materials and their relative amounts is determined by the choice of the final composition. In addition, relatively small concentrations of $N_mO_n$ oxides and, in the solid phase, insoluble components may be present, depending on the desired functionality, for instance decorative coatings or coatings with abrasive properties.

As substrates, it is possible to use for example types of stainless steel, cobalt-chromium alloys, titanium and its alloys, polymers and ceramics.

The resultant coating is a material without long-distance order (amorphous) according to the powder X-ray diffraction diagrams and the infrared and Raman spectra, which correspond to those of glasses with the same composition but prepared by melting.

The range of concentration in percentage weights of the different elements expressed in terms of their oxides, or in the case of fluoride as calcium fluoride, is given in Table 1 below. M(I) stands for valency 1 alkali metals, such as sodium, and M(II) for valency 2 alkaline earth metals, such as calcium; $N_mO_n$ stands for additions in small concentrations (a) of particular elements such as pigment, for example transition metals such as cobalt, or lanthanides such as neodymium, in order to lend certain colours or fluorescent properties to the glass. By insoluble components (b) are meant additives which do not dissolve in the glass but which lend it other mechanical properties, for example an abrasive character, such as aluminium nitrides, carbides, etc., or which make it opaque by light diffusion from small (<1 μm) dispersed particles.

TABLE 1

| $SiO_2$ | $M(I)_2O$ | $M(II)O$ | $P_2O_5$ | $B_2O_3$ | $CaF_2$ | $N_mO_n$ | inscl. comp. |
|---------|-----------|----------|----------|----------|---------|----------|--------------|
| 45–90   | 0–28      | 6–46     | 0–10     | 0–2      | 0–12    | (a)      | (b)          |

Further, in the process according to the invention, mainly the following essential steps can be distinguished:

I. conditioning of the powder, i.e. grinding to the desired particle size, dry mixing followed by pelletisation, or wet mixing, followed in the latter case by spray drying;

II. calcination or cold isostatic pressing, when there is no pelletisation;

III. breaking, wet or dry grinding or granulating and fractionating and, if isostatic pressing is used, sintering and limited granulation;

IV. plasma spraying.

These steps, with possible variants, are summarised in the following Table 2.

TABLE 2

|     | a              | b              | c              | d              |
|-----|----------------|----------------|----------------|----------------|
| I   | grinding       | grinding       | grinding       | grinding       |
|     | drying         |                |                |                |
|     | mixing         | wet mixing     | wet mixing     | wet mixing     |
|     | drying         |                |                |                |
|     |                | spray drying   | spray drying   | spray drying   |
|     | compacting     |                | compacting     |                |
| II  | calcining      | calcining      | calcining      | CIP            |
|     |                | CIP            |                |                |
| III | breaking       | breaking       | breaking       | breaking       |
|     | grinding       | granulating    | grinding       | granulating    |
|     | fractionating  | fractionating  | fractionating  | fractionating  |
|     |                | sintering      |                | calcining/     |
|     |                |                |                | sintering      |
|     |                | de-            |                | grinding       |
|     |                | agglomeration  |                | fractionating  |
| IV  | plasma         | plasma         | plasma         | plasma         |
|     | spraying       | spraying       | spraying       | spraying       |
|     | powder,        | powder,        | powder,        | powder,        |
|     | coating        | coating        | coating        | coating        |

These different steps and their variants as summarised in the above Table 2 are described in detail below.

I. Conditioning of the Powder

I.a Grinding, Mixing (Wet or Dry), Compacting

Grinding is carried out in an appropriate mill until a particle size <100 μm, preferably <30 μm, is obtained. This is determined by the homogeneity desired for the end product. Drying is mostly necessary for silicates, and is carried out at temperatures above 100° C. until constant weight is obtained, after which they are kept in closed containers. The chemical analysis is expressed in terms of dry weight.

Mixing can be carried out in a roller mill filled with balls or rods, or in another mixer apparatus, e.g. a "Turbula" or "Attritor" or suchlike. If wet mixing is carried out, quantities of a dispersion medium, such as acetone or alcohol, are added in sufficient quantity to obtain a viscosity that permits good mixing. These quantities are strongly dependent on the substances to be mixed. When very good microhomogeneity of the end product is required, it is advisable to add phosphate in the form of hydrogen phosphate when wet mixing. The acid reacts with part of the carbonate present, thus forming a phosphate in situ. As shown by microanalysis, this phosphate is very homogenously distributed over the powder particles. After recovery of the powder from the mixing apparatus, the dispersion medium is evaporated out. The mixture is then compacted by uniaxial pressing, e.g. to disks of 50 mm diameter and a weight of 10 g, at 2,500 bar. This step is not particularly critical. Compacting is done for two reasons: it reduces the volume before calcining, since the oven space is normally limited, and it raises the density of the product obtained at the end of step III. What is important here is for the disks to be sufficiently thin after compacting to let the carbon dioxide diffuse out of the mass without building up great pressures which would disintegrate the disks. Compacting to flakes can be an alternative to this, since it can be done quickly and continuously.

I.b Grinding, Wet Mixing and Spray Drying

Grinding is carried out as described under I.a. However, excellent mixing is obtained when a liquid, preferably aqueous, mush is mixed in an Attritor. The same remark concerning addition of phosphate in I.a applies here, and also to procedures c. and d. The use of an Attritor can if appropriate replace the prior mill processing. To this end, the substances are mixed with the suitable dispersion medium, preferably distilled water, such that mixing in a ball mill or Attritor is still possible. After the processing, the powder is recovered from the Attritor along with the pure dispersion medium—distilled water, where appropriate—and diluted until a suitable concentration is obtained for spray drying. Any ions which have gone into solution are precipitated again during spray drying. The end product consists of agglomerates with a very homogeneous composition. The so-called "spray drying" consists of spraying the dispersion into fine droplets and finely distributing these in a warm air current so that the dispersion liquid evaporates, thus forming dry granulate particles.

I.c Grinding, Dry Mixing, Spray Drying and Compacting

This step is the same as for I.b, except that the powder is compacted by uniaxial pressing. The compacting can be omitted if calcination in II.c is carried out between 900° C. and 1,100° C., so that there is good interdiffusion of the particles in the agglomerate and nearly all the $CO_2$ disappears. This temperature depends on among other things the desired porosity and surface texture of the end product. However, it should be noted that the whole process is aimed at minimum energy consumption and reduction of contamination. Accordingly, the aim is to work at temperatures that are as low as possible, for as short a time as possible.

I.d Grinding, Dry Mixing and Spray Drying

Same as under I.b.

II. Calcination and Compacting

Calcination may be necessary to increase the microhomogeneity of the final product and to remove as much as possible of the $CO_2$. During the heating, the carbonates decompose and have a flux effect. This facilitates the homogenisation and the transformation into glass during the stay in the plasma torch.

II.a Calcination

The pellets are placed vertically in trays of inert materials, such as platinum, in the oven, such that they do not touch one another and carbon dioxide gas can easily escape. Calcination is carried out at temperatures of 500–1,000° C., preferably 800° C., for 1 to 20 hours.

II.b Calcination and Compacting

The loose, spray-dried powder is calcined for 1 to 3 hours at 500–900° C., preferably 625° C. in inert crucibles. The calcined product is then subjected to cold isostatic pressing (CIP) at a pressure lower than 1,000 bar, which results in compression to around 50% of the theoretical density. Higher densities can also be used; this increases the density, but also carries a risk of contamination during granulation.

II.c Calcination

The calcination can be the same as in II.a. If the compacting is omitted in I.c., then calcination is carried out at temperatures between 900° and 1,100° C., but during a shorter time than in II.a.

II.d Compacting

In a variant, calcination is omitted and cold isostatic pressing of the untreated spray-dried product is immediately carried out.

III. Breaking, Grinding, Granulating and Fractionating

After calcining, the compacts are broken into pieces with size suitable for feeding to the grinder to be used. Wet or dry milling is then carried out, and the fraction suitable for plasma spraying is separated out by wet or dry fractionating, for example by means of a cyclone or sieve.

III.a Breaking, Grinding, Fractionating

The calcined compacts, e.g. disks obtained by uniaxial compacting, are first broken into pieces suitable for feeding into the mill to be used. After grinding a fraction is separated by dry or wet sieving or by other ways of fractionating. A fraction is separated out which, depending on the properties desired for the final product (powder or coating: homogeneity, porosity), has a narrower or wider spread of particle sizes. When wet sieving is carried out, the dispersion medium, e.g. water, must previously be brought into equilibrium with powder of the same composition as the sieved product in order not to modify the composition, or to modify it as little as possible. The powder is then dried. If the powder is not sufficiently flowing, and if this property deteriorates further with time, the fluidity can be improved by keeping the powder for a few hours in a $CO_2$ atmosphere.

III.b Breaking, Grinding, Fractionating, Sintering and Deagglomeration

As indicated in II.b, by cold (CIP) a product is obtained that can be granulated to the desired fraction. This granulate can be obtained by breaking, grinding and fractionating to a fraction smaller than 200 $\mu$m. The fraction that is granulated too finely can be recycled by the isostatic pressing (CIP).

The too coarse fraction can be fed back into the granulator. The suitable fraction is then sintered for 1–5 hours at a temperature higher than the calcining temperature used in II.b. This process increases the density within each granulate particle separately, and favours the fluidity of the powder. After sintering, only a light de-agglomeration process and possibly a last sieving have to be carried out. This procedure gives a better yield of sprayable powder.

III.c Breaking, Grinding, Fractionating

Same as in III.a.

III.d Cold Isostatic Pressing (CIP), Breaking, Granulating, Fractionating, Calcining/Sintering, Grinding and Fractionating The cold isostatically pressed product can be broken, granulated and fractionated to a granulate with a particle size between 20 and 150 $\mu$m, preferably within a shorter interval from 63 to 125 $\mu$m. The too finely granulated fraction can be recycled by CIP. The too coarse fraction can be further reduced to a finer granulate within the desired interval.

The granulate with a particle size between 20 and 150 $\mu$m, or narrower as mentioned above, is then calcined/sintered at temperatures above 600° C., e.g. 800° C. The product obtained is further e.g. wet ground and fractionated. This route is somewhat longer than in variant c., but permits a higher grinding yield due to crack propagation in the sintered mass with controlled porosity.

IV. Plasma Spraying

The plasma spraying is the classic process, and so a detailed description of it is not considered necessary. The choice of parameters is independent of the type of powder and its method of preparation. The optimisation of the plasma parameters depends on the composition and the properties desired for the end product. A test spraying and an analysis of the sprayed product is of course always necessary in order to check whether the composition is as intended. If it is not, small corrections must be applied.

The powder obtained in III is checked for fluidity. If this is sufficient, then the powder is ready for feeding to the plasma torch. Voltage, electrical power and powder flow rate must be optimised for each individual installation. If spraying is carried out in a closed container, the product can be collected as a powder, either dry or in water. If coatings are to be applied, the distance from the substrate to the torch must also be optimised, as must the translation/rotation of the substrate, in order to obtain a coating which has the desired thickness and porosity and which also has good adhesion.

EXAMPLES

Example 1 (Table 2.a)
The desired final composition of the glass was:

| $SiO_2$ | $Na_2O$ | $CaO$ | $P_2O_5$ | $B_2O_3$ | $CaF_2$ |
|---|---|---|---|---|---|
| 54.2 | 16.4 | 19.8 | 7.6 | — | 2.00 |

The following basic chemicals were used, with the composition expressed in % weight:

| | |
|---|---|
| calcium silicate $((CaO)_a(SiO_2)_b)_{hydr}$ | 61.69 |
| sodium silicate $((Na_2O)_a(SiO_2)_b)_{hydr}$ | 2.1 |
| sodium carbonate $(Na_2CO_3)$ | 21.52 |
| (tri)calcium phosphate $(Ca_3(PO_4)_2)$ | 13.06 |
| calcium fluoride $(CaF_2)$ | 1.63 |

The quantity of calcium silicate was calculated on the basis of the chemical analysis, since the commercial product does not have a stoichiometric composition. The ratio a/b was of the order of magnitude of ¼.

Before weighing and mixing the materials, all were separately ground in a planetary grinder to a particle size with a median of approximately 14 $\mu$m. All components were dried at 120° C. for several hours. The dry materials were then weighed and mixed in a ball or rod grinder, more specifically a 6 liter ceramic container, in quantities of 500 g in 2 l acetone and 2 kg $Al_2O_3$ rods of 12 mm diameter and 13 mm height during 4 hours.

At the end of mixing, the powder was recovered, after which the acetone was evaporated and the product dried at 110° C. for one hour.

Batches of 10 g powder were then pelletised as disks of 50 mm (approx. 2 inch) diameter, by uniaxial pressing at a pressure of 2,500 bar. The disks were then calcined in platinum trays in an oven at 800° C. during 8 hours.

After the heat treatment, the disks were broken in a mortar or a jaw breaker and dry ground in a planetary grinder. The powder was then sieved on a vibrating sieve, and the fractions 32–63 $\mu$m and 63–100 $\mu$m retained. These fractions formed a freely-flowing powder, suitable for the plasma torch.

The parameters for plasma spraying were optimised on the basis of a factorial scheme. Using a Metco plasma spray system, a dense, strongly-adhering substrate was obtained on a titanium substrate at a power of 35 kW, with 70 mbar hopper pressure and a spraying distance of 100 mm.

Example 2 (Table 2.b)
The desired final composition of the glass was:

| $SiO_2$ | $Na_2O$ | $CaO$ | $P_2O_5$ | $B_2O_3$ | $CaF_2$ |
|---|---|---|---|---|---|
| 52.0 | 9.8 | 30.5 | 6.2 | — | 1.5 |

The following basic chemicals were used, with composition expressed in percentage weight:

| | |
|---|---|
| calcium silicate $((CaO)_a(SiO_2)_b)$ | 58.51 |
| sodium carbonate $(Na_2CO_3)$ | 12.81 |
| calcium carbonate $(CaCO_3)$ | 16.87 |
| (tri)calcium phosphate $(Ca_3(PO_4)_2)$ | 10.36 |
| calcium fluoride $(CaF_2)$ | 1.15 |

The amount of calcium silicate was calculated on the basis of the chemical analysis, since the commercially available products do not have a stoichiometric composition. An alternative mixture with another phosphate source had the following composition:

| | |
|---|---|
| calcium silicate $((CaO)_a(SiO_2)_b)$ | 58.98 |
| calcium carbonate $(CaCO_3)$ | 15.80 |
| sodium carbonate $(Na_2CO_3)$ | 12.85 |
| calcium hydroxy apatite $(Ca_{10}(PO_4)_6(OH)_2)$ | 11.22 |
| calcium fluoride $(CaF_2)$ | 1.15 |

A computer program was used to calculate the relative amounts to be used. A unique solution was not always obtained, but it is clear that not all final concentrations can be obtained with any desired combination of products.

Before weighing and mixing the substances, all of them were ground separately in a planetary grinder, so as to obtain a particle size with a median of approximately 14 $\mu$m. All components were dried at 120° C. for several hours. The dry products were then weighed and mixed in an attritor in a ratio of 675 g basic chemicals to 2 l distilled water. In this operation a NFT attritor (mark Netzsch) was used. The dispersion was mixed with 4.6 kg of $Al_2O_3$ balls with a diameter of 2.5 to 3.5 mm, and mixing was carried out for 1 hour at a speed of 80 rpm.

After mixing, the powder was separated from the $Al_2O_3$ balls with distilled water to a volume at which a dispersion of 100 g powder/l was obtained. This dispersion was then spray dried. The spray dried powder was an intimate mixture of the different components.

The spray dried powder was calcined for 2 hours at 625° C. in Ni—NiO crucibles. The calcined product was then CIP-compacted at 1,000 bar to a density of approximately 50% of the theoretical density.

The compacted product was then broken, granulated in a Frewitt granulator and sieved. The fraction smaller than the desired fraction of 63–125 $\mu$m was recycled by the compacting, and the coarser fraction was granulated further in the Frewitt granulator. After sintering at 800° C. and slight de-agglomeration, a freely flowing powder was also obtained, suitable for plasma spraying as in example 1.

The same conditions for plasma spraying were used as in example 1.

Example 3 (Table 2.c)

The composition and conditioning of the powder were the same as in example 2, up to and including the spray drying.

The powder was then, as in example 1, compacted to discs with a diameter of 50 mm and a weight of about 10 g. The discs were then placed in platinum trays in the oven and calcined for 4 hours at 800° C.

After calcining, the calcined discs were broken, wet ground and sieved. For the wet grinding, water was always used that had been previously been brought into equilibrium with powder of the same composition as the ground product. After drying the 30–104 $\mu$m fraction was retained. Post-treatment of the powder in a $CO_2$ atmosphere during 4 hours can if desired improve the fluidity of the powder.

The same conditions for plasma spraying were used as in example 1.

Example 4 (Table 2.d)

The composition and the conditioning of the powder were the same as in example 2, up to and including the spray drying. The spray dried product was immediately subjected to isostatic pressing without prior calcining.

The compressed product was then broken in a jaw breaker. The pieces obtained were made smaller with a Frewitt granulator. The granulate obtained was divided into three fractions by sieving. A fraction smaller than 63 $\mu$m could be used again by compressing. The fraction larger than 125 $\mu$m was further reduced in the granulator. The 63–125 $\mu$m fraction was calcined/sintered at 900° C. The sintered mass was wet ground and sieved as in example 3. For the wet grinding, water was always used that had been previously been brought into equilibrium with powder of the same composition as the ground product. The coarse fraction was further wet ground.

The same conditions for plasma spraying were used as in example 1.

The glass prepared according to this process can be obtained both in the form of powders and in the form of films.

As powders with the composition of a bioactive glass, they can be used as fillers in polymers with biomedical applications for promoting the growing in of hard tissue in implants. They can also be used as such for medical purposes, for filling up bone traumas.

As films of bioactive glasses, they can be used for promoting the growing in of bone, or in general for improving the general biocompatibility of an implant made of a metal alloy. Such films can be used as an alternative for films or coatings on metals or alloys, smooth layers with better tribological properties, layers with an abrasive action or with non-wearing properties.

The invention is of course not in any way limited to the embodiments described above, among other things as concerns the different steps and parameters for obtaining a suitable powder of the raw materials from which the glass is to be synthesised in a plasma torch; on the contrary, within the scope of the invention it is possible to consider different changes in this connection, which are dependent on among other things the nature of these raw materials.

By the use of suitable injectors which themselves are known, the different raw materials can be fed separately to a plasma torch in the form of a freely flowing powder in the desired ratios, in which they are then mixed with each other and react to form glass.

The invention further does not only relate to a process for preparing the glass but also extends to the process for preparing the suitable freely flowing powder.

We claim:

1. A process for the manufacture of glass, comprising:
    grinding and mixing glass precursors including a source of silicon oxide and a source of at least one of sodium oxide and calcium oxide, and optionally a source of phosphorous, to obtain a ground mixture of glass precursors;
    (1a) compacting said ground mixture by cold isostatic pressing to obtain a compacted body and breaking said compacted body into particles, or (1b) calcining said ground mixture, followed by (2a) grinding and fractionating the resultant ground particles, or (2b) sintering and granulating, thereby providing (3) a free-flowing, substantially homogeneous powder or granular mixture from mainly crystalline material, said glass precursors in substantially homogeneous powder or granular form; and
    converting said substantially homogeneous glass precursors in powder or granular form into glass in a plasma torch by feeding said powder or granular mixture to said plasma torch.

2. A process according to claim 1 wherein said glass precursors are substantially crystalline and are sprayed into said plasma torch.

3. A process according to claim 1 wherein said glass precursors are in powder form with a particle size distribution smaller than 50 $\mu$m.

4. A process according to claim 1 wherein said glass precursors are in powder form with a particle size distribution smaller than 30 $\mu$m.

5. A process according to claim 1 wherein said glass precursors comprise at least one of calcium silicate and sodium silicate.

6. A process according to claim 1 wherein said glass precursor mixture is 45–90% silica, 0–28% sodium oxide, 6–46% calcium oxide, 0–10% phosphoric oxide, 0–2% $B_2O_3$ and 0–12% $CaF_2$.

7. A process according to claim 1 wherein said free-flowing, substantially homogeneous powder or granular mixture further includes a flux of an alkaline earth carbonate, an alkali carbonate, or a mixture thereof.

8. A process according to claim 1 wherein said glass precursor mixture further includes a compound of a transition element or a lanthanide.

9. A process according to claim 1 wherein said ground mixture is prepared by optionally drying said glass precursors, and said mixing of said glass precursors is in a dispersion medium; and evaporating said dispersion medium.

10. A process according to claim 1 wherein said free-flowing, substantially homogeneous powder or granular mixture is prepared by wet mixing said glass precursors, followed by spray drying.

11. A process according to claim 1 wherein, after said compacting by cold isostatic pressing, the resultant compacted body is broken, then subjected to at least one of grinding and granulating, and then fractionated into different fractions based on sizes of particles, one said fraction being selected for said conversion into glass in said plasma torch.

12. A process according to claim 11 wherein said fraction selected for conversion into glass is subjected to at least one of sintering or calcining prior to said step of being converted into glass in said plasma torch.

13. A process according to claim 12 wherein said fraction selected for conversion into glass in the plasma torch, following at least one of said sintering and calcination, is subjected to at least one of deagglomeration and grinding, followed by said fractionating before being converted to glass in the plasma torch.

14. A process according to claim 1 wherein said free-flowing, substantially homogeneous powder is fed to said plasma torch in a closed container with said glass being collected in powder form.

15. A process according to claim 1 wherein said free-flowing substantially homogeneous powder or granular mixture is sprayed into said plasma torch adjacent a receiving substrate so that said glass is formed as a film on said receiving substrate.

16. A process according to claim 1 wherein said glass precursors include a said source of phosphorous.

* * * * *